3,519,704
METHOD OF SEALING ANCHOR NAIL FASTENERS
Robert J. Maginnis, Stone Mountain, Ga., assignor to Simplex Nail & Manufacturing Corporation, Americus, Ga., a corporation of Michigan
Continuation-in-part of application Ser. No. 658,266, Aug. 3, 1967. This application Apr. 29, 1969, Ser. No. 822,855
Int. Cl. B29d *31/00*
U.S. Cl. 264—69                                  9 Claims

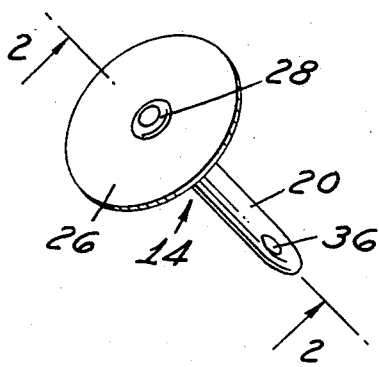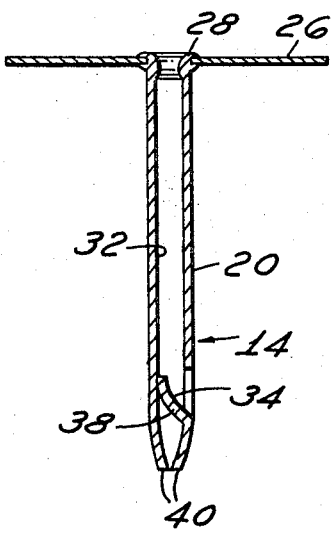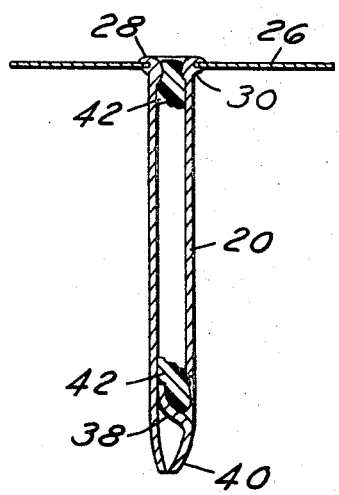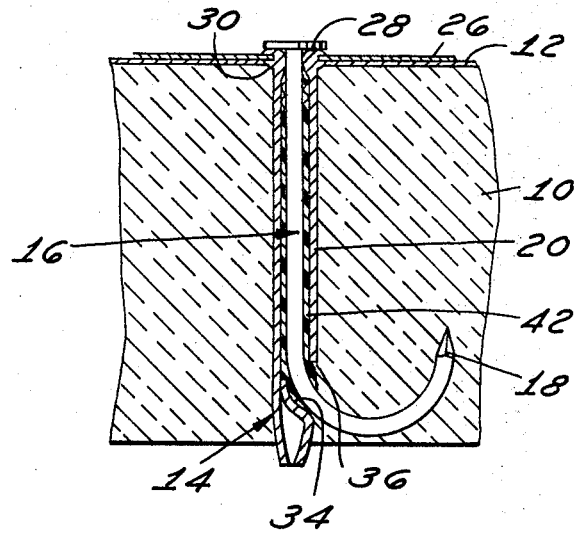
INVENTOR.
ROBERT J. MAGINNIS
BY
Burton & Parker
ATTORNEYS

United States Patent Office 3,519,704
Patented July 7, 1970

ABSTRACT OF THE DISCLOSURE

Generally, this disclosure relates to a method of sealing anchor nail fasteners, such as disclosed in my U.S. Letters Patent 3,177,753. The method includes combining a sealant having a liquid vehicle with the tubes, heating and agitating the tubes until the sealant becomes granular, adding water and continuing to heat and agitate until the sealant is dry, and the tubes are sealed.

---

This application is a continuation-in-part application of my copending application for U.S. Letters Patent, Ser. No. 658,266, now abandoned, filed Aug. 3, 1967.

In my U.S. Letters Patent No. 3,177,753 I disclosed a sealed anchor nail fastener designed for securing tarpaper or other coverings to building panels, such as insulation panels formed of relatively porous materials in which the conventional nail fasteners will not hold. Such fastener comprised a tubular body portion adapted to be driven into the panel having a relatively large head at one end for limiting penetration of the panel and a side opening aperture adjacent the opposite end with a nail deflecting surface in the tube adjacent the aperture to deflect a nail driven down through the tube laterally outwardly through the aperture and into the panel. A waterproof plastic was strippably adhered to the shank of the nail such that when the nail was driven into the tubular body a gasket was formed in situ, between the upper end of the tube and the underside of the head of the nail, caused by the accumulation of the plastic at the constriction.

The resultant seal however, was dependent upon driving a nail in the tubular guide, which may not be satisfactory under certain conditions. For example, a roof construction may require a large number of fasteners, wherein the tubular nail guides are first driven through the roofing material into the building panels. Finally, the anchor nails are driven into the tubular guides to extend laterally into the building panel. The strippable sealant on the nail seals the tubular guide, however if one nail is missed by the workman, the tubular nail will not be sealed. It is therefore a primary object of this invention to find a means of sealing the tubular guide independently of the nails to prevent leakage under these conditions.

Several methods were tried, including dipping the nail guides in plastics, and tumbling the tubular nail guides in liquid and granular plastics. However, these methods proved unsuccessful probably because of the small diameter of the tubes, and the configuration of the lateral opening.

The method of my invention provides an excellent seal of combining a sealant having a liquid vehicle and the tubular guides, heating and agitating the guides and the sealant until the sealant has become dry and granular. Water is then added, and the heating and agitating continued until the tubes are dry; at which time the tubes are sealed at both ends. The requisite volume of water added will depend upon the number of tubes, however sufficient water should be added to moisten the tubes.

Other objects, advantages, and meritorious features of this invention will more fully appear from the following specification, claims, and accompanying drawings, wherein:

FIG. 1 is a perspective view of the tubular anchor nail fastener guide prior to sealing;

FIG. 2 is a cross sectional view of FIG. 1 in the direction of view arrows 2—2;

FIG. 3 is a cross sectional view of the tubular nail guide after the guide has been sealed by the method of this invention; and FIG. 4 is a cross sectional view through an anchor nail fastener similar to FIG. 3, showing the same disposed within a workpiece, such as an insulation panel.

The fastener disclosed herein, as mentioned above, is particularly suitable for use with relatively porous building panels, such as panels formed of a relatively dense material but with voids therein which prevent the satisfactory utilization of conventional nail-type fasteners. While the fastener is particularly suitable for use with fiberboard panels of the type sold under the trademarks of Tectum fiberboard panels or Insulrock fiberboard panels, the fastener may also be used with other types of board and applications for use with natural wood boards are feasible. The term "board" or "panel" as used herein is intended as a generic expression covering all materials for which the fastener may prove satisfactory. The insulation board or panel for which this fastener has been particularly designed may be of the type made of wood shavings held together with a shrinkable binder. The fastener may be used to secure waterproof paper, such as tarpaper or the like, or other waterproof coverings, upon the insulation board, or to secure two boards together, either one or both of which boards may be a dense material having voids preventing use of conventional nail-type fasteners. The fastener may also find use in asphalt impregnated insulation or other materials for securing coverings, accessory items, or parts thereto.

The nail may also find utilization in securing shingles or the like to porous roof or siding boards where conventional shingle nails would tend to pull loose. In the event the fastener is used to secure shingles or the like, the length of the tube may be somewhat longer than that indicated in the drawings.

FIG. 4 illustrates, by way of example, an anchor nail fastener secured within a panel or insulation board 10 utilized to secure a sheet of tarpaper or the like 12 to the upper surface of the panel. The board or panel 10 is of the aforementioned character comprising a relatively dense material held together with a suitable binder and having voids therein. The panel may be of one piece as shown, or two or more pieces as described hereinabove.

The fastener comprises a nail guide and deflector tube indicated generally at 14 and an anchor nail indicated generally at 16. As shown, the nail guide and deflector member has been driven into the board 10 and the nail 16 has been driven into the nail guide and the deflector with its pointed end 18 curled laterally outwardly and upwardly through a side opening aperture 36 in the tube and embedded in the panel.

The nail guide and deflector preferably comprises a tube 20 formed of seamless steel tubing. Other forms of tubing may be found satisfactory but the seamless steel type has the requisite strength and rigidity suitable for the intended purpose described herein. The tube is provided at its upper end with means for limiting penetration into the board 10 and also for holding tarpaper or the like 12 to the panel. Such means preferably comprises an annular flange or head 26, of washer-like configuration which is secured to the upper end of the tube by upsetting the tube wall as at 28 and 30. The connection between the head 26 and the upper end of the tube prevents rainwater, moisture, tar or the like from creeping over the upper surface of the head and down the outside of the tube wall. This joint may be readily accomplished by upsetting the tube wall as shown with the upset portion tightly gripping the head 26 at the opening therethrough, through which the tube extends.

The tubular guide 14 is provided with an axial bore 32 substantially closed at the lower end. By means described below a nail point deflecting surface 34 is provided. Such means comprises an inwardly struck wall portion of the tube. Opposite surface 34, the tube wall is punched to provide the lateral opening aperture 36, with the severed wall portion being laid back inwardly to provide the upwardly and outwardly facing surface 34. Such inwardly bent wall portion is indicated at 38.

The lower end of the tube is substantially, though not completely closed. In cutting off the tube 20 from the length of tubing from which it is formed, the shearing dies may be so provided that the tube walls are bent toward each other as at 40. If desired, such lower end of the tube may be completely closed. The upper end of the wall portion 38 bears against the side wall of the tube opposite aperture 36 such that as the point 18 of the nail is driven downwardly through the tube, and engages the surface 34, the wall of the tube in abutment with portion 38 will tend to prevent such portion from collapsing downwardly as the nail is deflected laterally outwardly through the aperture 36.

Preferably, the nail 16 should be of such a length that it extends laterally into the support panel, as shown in FIG. 4, when it is driven into the tubular guide 14. It will be noted that the point 18 of the nail is disposed substantially directly below the periphery of the large head 26. For a tube having a length of approximately 1⅛ inches and an outside diameter of ⁵⁄₃₂, nail 16 may be similar to a box nail 1⅝ inches in length with a shank diameter approximately ¹⁄₁₆ of an inch and a head diameter of approximately ³⁄₁₆ of an inch. The head 26 of the tube 20 may be approximately 1 inch. A common wire box nail will be suitable for use with the tube.

In the form of the anchor nail fastener and sealing means shown in my U.S. Pat. 3,177,753, the driving of the nail in the tubular nail guide seals the fastener against moisture and rain, however where the nail was not inserted in the nail guide, moisture, rain, and the like would tend to leak downwardly around the nail 16 between it and the bore of the tube 20 and thereby gain access to the interior of the panel or board 10, or penetrate completely through the board to the underside thereof. Where tar or other substances were applied over a deck through which the anchor nails were driven, the hot tar either at the time of its application, or subsequently through the influence of solar heat, would tend to run down the tube 20 and spot the underside of the panel 10 or any covering that might be applied to the underside of the panel. To prevent such undesirable consequences, the applicant has devised a means to seal the tubular guides, and thus prevent leakage even where the nail is not driven into the tubular guide.

Basically, the method of sealing the tubular nail guides, also referred to herein as "tubes," involves agitating the tubes with a suitable sealant. The tubes are placed in a tumbling barrel and heated to a temperature sufficient to vaporize the sealant vehicle. The tubes and the sealant are then tumbled until the sealant is dry and granular. Where an acrylic vinyl resin is used as the sealant, a temperature of 400 to 500 degrees Fahrenheit has been found satisfactory. An acrylic vinyl resin is commercially available under the trade name "Box Glue," distributed by the Borden Chemical Company.

It was expected that the tubes would be sealed at this stage of the process, but such was not the case. It was discovered, however, that if water is added to the granular sealant, and the heating and tumbling is continued until the tubes are dry, the tubes are sealed at both ends, as shown at 42 in FIGS. 3 and 4. The water does not dissolve the granular sealant, and the applicant is not certain of the sealing mechanism, although skilled in the art. It is presently believed however that the application of water to the heated tubes and granular sealant suddenly cools the tubes and tends to draw the partially cured sealant into the tube openings. The volume of water should therefore be sufficient to moisten the tubes, and will depend upon the volume of tubes processed.

In a typical example of the method of this invention, a ⅓ cubic yard tumbling barrel was loaded with five thousand, 1¾ inch long tubular nail guides, approximately 92 pounds. One quart liquid vinyl adhesive and 2 to 2½ quarts water were then added, and the tumbling barrel was rotated to mix the sealant. A fifty thousand B.t.u. per hour blower was then inserted into the mouth of the rotating barrel and heat applied for approximately 30 minutes, or until the vinyl resin became dry and granular. The tubes were thus heated to approximately 400 to 500 degrees Fahrenheit. Finally, 1 to 1½ quarts of water were added to the barrel, and the tumbling and heating continued for approximately 20 minutes. The tubes were then sealed at both ends, as shown in FIG. 3. The same process, for example, is used for five thousand pieces of the 1 inch tubular nail guides, except that the volume of water and adhesive was reduced approximately ⅓. If the nails are taken out prior to the sealant becoming granular, the nails are stuck together, and the ends are not sealed.

The volume of water and adhesive is therefore dependent upon the volume of tubes processed. The volume of water initially added will depend upon the volume of adhesive used. For example, the initial volume of water must be sufficient to mix with the adhesive, but a substantial excess will materially increase the heating time. The volume of water added after the initial heating and tumbling should not be sufficient to wash the adhesive off of the tubes, but should be sufficient to moisten or "cool" the tubes, as described hereinabove.

The specific details of the anchor nail fastener have been described to illustrate the purpose and resultant product of the method of this invention. However, it will be understood by those skilled in the art that various modifications may be made to the structural details without departing from the purview of the appended claims, which are directed to the method of sealing the tubular guide of an anchor nail fastener.

What is claimed is:

1. A method of sealing the tubular portion of an anchor nail fastener, comprising: combining a sealant having a liquid vehicle and the tubes, heating and agitating the combination until the sealant has become dry and granular, adding sufficient water to moisten the tubes and continuing to heat and agitate the combination until dry at which time the tubes are sealed against moisture.

2. The method of sealing the tubular portion of an anchor nail fastener defined in claim 1, characterized in that the volume of water added is sufficient to cool the tubes.

3. The method of sealing the tubular portion of an anchor nail fastener defined in claim 2, characterized in that the tubes are heated to a temperature of 400 to 500 degrees Fahrenheit.

4. The method of sealing the tubular portion of an anchor nail fastener defined in claim 1, characterized in that the tubes and the sealant are agitated by tumbling.

5. The method of sealing the tubular portion of an anchor nail fastener defined in claim 1, characterized in that the tubes and the sealant are first agitated by tumbling and heating until the sealant vehicle is vaporized.

6. The method of sealing the tubular portion of an anchor nail fastener defined in claim 1, characterized in that the water added after the sealant is dry is generally equal in volume to the sealant originally present, not including the liquid vehicle.

7. The method of sealing the tubular portion of an anchor nail fastener defined in claim 1, characterized in that the sealant is a liquid acrylic vinyl resin.

8. A method of sealing the tubular portion of an anchor nail fastener, comprising the steps of: placing the tubes in a tumbling barrel, heating the tubes, adding a liquid acrylic vinyl sealant, tumbling the tubes and the sealant in the barrel under heat until the sealant vehicle is vaporized, adding sufficient water to cool the tubes, and continuing to heat and tumble the combination until dry at which time the tubes are sealed against moisture.

9. The method of sealing the tubular portion of an anchor nail fastener defined in claim 8, characterized in that the tubes are heated to a temperature range of 400 to 500 degrees Fahrenheit and maintained at that temperature during the tumbling process.

References Cited

UNITED STATES PATENTS

| 3,376,040 | 4/1968 | Moehlman et al. | 264—63 |
| 3,177,753 | 4/1965 | Maginnis | 85—23 |

ROBERT F. WHITE, Primary Examiner

R. H. SHEAR, Assistant Examiner

U.S. Cl. X.R.

264—267